(12) United States Patent
Albrecht

(10) Patent No.: US 8,593,751 B2
(45) Date of Patent: Nov. 26, 2013

(54) PATTERNED MAGNETIC RECORDING DISK FOR MULTI-TRACK RECORDING WITH COMPENSATION FOR HEAD SKEW

(75) Inventor: Thomas R. Albrecht, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 188 days.

(21) Appl. No.: 13/308,189

(22) Filed: Nov. 30, 2011

(65) Prior Publication Data
US 2013/0135768 A1    May 30, 2013

(51) Int. Cl.
*G11B 5/02* (2006.01)

(52) U.S. Cl.
USPC ............................. 360/55; 360/135; 428/848.5

(58) Field of Classification Search
USPC ............... 360/135, 55, 59, 75, 48; 428/848.5, 428/848, 848.1, 848.2, 848.3
See application file for complete search history.

(56) References Cited

U.S. PATENT DOCUMENTS

| | | | |
|---|---|---|---|
| 7,758,981 B2 | 7/2010 | Albrecht | |
| 7,782,561 B2 | 8/2010 | Albrecht et al. | |
| 7,848,046 B2 | 12/2010 | Sakurai et al. | |
| 8,003,236 B2* | 8/2011 | Albrecht et al. | 428/826 |
| 2009/0029191 A1* | 1/2009 | Albrecht | 428/848 |
| 2009/0308837 A1 | 12/2009 | Albrecht et al. | |
| 2012/0217220 A1* | 8/2012 | Dobisz et al. | 216/41 |
| 2013/0126473 A1* | 5/2013 | Dobisz et al. | 216/49 |

FOREIGN PATENT DOCUMENTS

JP    2010129142 A    6/2010

* cited by examiner

*Primary Examiner* — Tan X Dinh
(74) *Attorney, Agent, or Firm* — Thomas R. Berthold

(57) ABSTRACT

The invention is a patterned-media disks for multi-track recording that are fabricated by nanoimprinting from a master template and that have data islands arranged in a pattern to compensate for head skew. The islands are arranged along lines canted relative to a disk radial line by an acute angle, as required for multi-track recording. However, this angle is not the same for all bands, but varies from band to band to compensate for head skew. The angle the lines in a band are canted is reduced by the amount of head skew. There are a plurality of bands between the disk inside-diameter (ID) and mid-diameter (MD) where the angle is in one direction from a radial line and a plurality of bands between the disk MD and outside-diameter (OD) where the angle is in the opposite direction from a radial line.

17 Claims, 6 Drawing Sheets

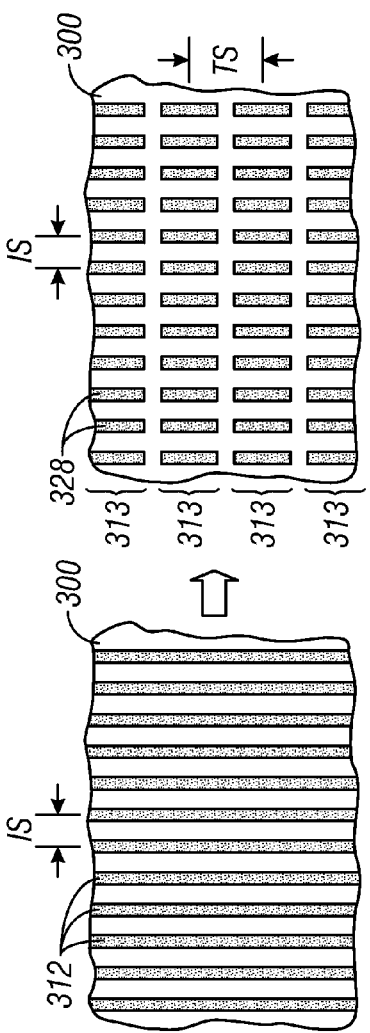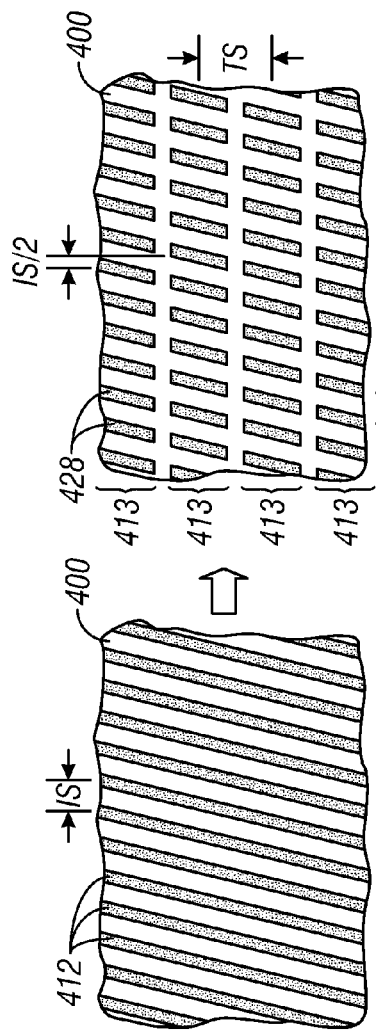

PATTERNED MAGNETIC RECORDING DISK FOR MULTI-TRACK RECORDING WITH COMPENSATION FOR HEAD SKEW

BACKGROUND OF THE INVENTION

1. Field of the Invention

This invention relates generally to patterned-media magnetic recording disks, wherein each data bit is stored in a magnetically isolated data island on the disk, and more particularly to patterned-media disks for multi-track recording.

2. Description of the Related Art

Magnetic recording hard disk drives with patterned magnetic recording media have been proposed to increase data density. In patterned media, the magnetic recording layer on the disk is patterned into small discrete magnetic data islands separated by nonmagnetic spaces and arranged in concentric data tracks. To produce the required magnetic isolation of the patterned data islands, the magnetic moment of spaces between the islands must be destroyed or substantially reduced to render these spaces essentially nonmagnetic.

One proposed method for fabricating patterned-media disks is by nanoimprinting with a disk or template, sometimes also called a "stamper", that has a topographic surface pattern. In this method the magnetic recording disk substrate with a polymer film on its surface is pressed against the template. The polymer film receives the reverse image of the template pattern and then becomes a mask for subsequent etching of the disk substrate to form the pillars on the disk. In one type of patterned media, the magnetic layers and other layers needed for the magnetic recording disk are first deposited on the flat disk substrate. The polymer film used with nanoimprinting is then pressed on top of these layers. The polymer film receives the reverse image of the mold pattern and then becomes a mask for subsequent milling, etching or ion-bombarding the underlying layers. In another type of patterned media, the magnetic layer and other layers needed for the magnetic recording disk are then deposited onto the etched disk substrate and the tops of the pillars to form the patterned-media disk. The template may be a master template for directly imprinting the disks. However, the more likely approach is to fabricate a master template with a pattern of pillars corresponding to the pattern of pillars desired for the disks and to use this master template to fabricate replica templates. The replica templates will thus have a pattern of recesses or holes corresponding to the pattern of pillars on the master template. The replica templates are then used to directly imprint the disks.

In the proposed patterned disks, the data islands are equally spaced along single data tracks with the data tracks being equally spaced in the radial or cross-track direction. The read and write heads read and write the data islands on a single track so the data islands are typically sized to generally match the lateral or cross-track width of the heads. The data islands are spaced to define a bit aspect ratio (BAR). The BAR is the ratio of track spacing (TS) or pitch in the radial or cross-track direction to the island spacing (IS) or pitch in the circumferential or along-the-track direction, which is the same as the ratio of linear island density in bits per inch (BPI) in the along-the-track direction to the track density in tracks per inch (TPI) in the cross-track direction. To minimize the resolution requirement for fabricating the islands, it is preferable that the array of islands have a low BAR (about 1). However, it is difficult to fabricate read/write heads with the proper performance for very narrow tracks with data islands having this low BAR. Also, if the single data tracks are too closely spaced, islands in tracks adjacent to the track being written may also be written by fringing fields from the write head, and the readback signal from a data track being read may receive interference from data recorded in adjacent tracks.

To address these problems a patterned-media disk drive for multi-track recording has been proposed. This allows the heads to be wider, which makes them easier to fabricate, and also allows the drive to read and write two tracks at a time, thereby doubling the data rate and bringing the performance closer to conventional disk drives. For a two-track recording disk drive, the islands in each track are shifted in the along-the-track direction by ½ times the island spacing (IS) from the islands in adjacent tracks. The read and write heads have a lateral or cross-track width to allow writing and reading two tracks at a time without excess interference from tracks beyond the pair being written or read. The heads read or write all the data islands in two tracks by alternately reading or writing the islands from each of the tracks in succession. This type of patterned media multi-track recording disk drive is described in U.S. Pat. No. 6,937,421 and U.S. Pat. No. 7,782,561.

The proposed patterned-media disk for multi-track recording has circular islands arranged in a hexagonal-close-packed (hcp) pattern. This results in a low BAR of 0.87, which is preferred because of ease of lithography and fabrication. However, a low BAR results in a very narrow track pitch or spacing (TS) which makes fabrication of the read and write heads difficult. A low BAR also stresses the track following servo system because of very narrow tracks, and lowers the data rate due to relatively low linear (along-the-track) bit density. An additional problem with multi-track recording, especially with circular islands in an hcp pattern, arises because of head "skew". Because the read head is fixed at the tip of a rotary actuator, it is not always orthogonal to the tracks but makes an angle with the tracks as it moves in an arcuate path across the disk. This can result in the read head reading islands from adjacent tracks simultaneously, rather than alternately as required for multi-track recording.

What is needed is a patterned-media disk for multi-track recording with a data island pattern that addresses the problems associated with multi-track recording.

SUMMARY OF THE INVENTION

The invention relates to patterned-media disks for multi-track recording that are fabricated by nanoimprinting from a master template. The disks are preferably perpendicular magnetic recording disks so the islands are magnetizable perpendicularly to the substrate. The islands are arranged to have a BAR greater than 0.87 (the BAR for an hcp island pattern) and are arranged along lines canted relative to a disk radial line by an acute angle, as required for multi-track recording. However, this angle is not the same for all bands, but varies from band to band to compensate for head skew. The angle the lines in a band are canted is reduced by the amount of head skew. This shifts the islands in a track by a slight additional amount, which improves the relative positions of islands in one track and its neighboring track so that the two tracks are out of phase with respect to the read element, thereby allowing the read head to pass over and sense the magnetic flux from islands in the two tracks in a sequential alternating manner, as required for multi-track recoding. Because the head skew varies with disk radius, there is a point near the disk mid-diameter (MD), typically within the middle third of the disk, where the head skew is zero. Thus there are a plurality of bands between the disk inside-diameter (ID) and MD where the angle is in one direction from a radial line and a plurality of bands between the disk MD and outside-diameter (OD) where the angle is in the opposite direction from a radial line.

The patterned-media disks with the island pattern described above are fabricated by nanoimprinting from a master template. The master template may be used to directly nanoimprint the disks, but more likely is used to make replica templates which are then used to directly nanoimprint the disks. Thus this invention is also a master or replica template for nanoimprinting the patterned-media disks with the pattern of islands described above.

For a fuller understanding of the nature and advantages of the present invention, reference should be made to the following detailed description taken together with the accompanying figures.

BRIEF DESCRIPTION OF THE DRAWING

FIGS. 6A, 6B and 6C are views of a small portion of one annular band of the master template at successive stages of the prior art method of making master template.

FIGS. 7A, 7B and 7C are views of a small portion of one annular band of the master template at successive stages of the method of making the master template that is used to nanoimprint the magnetic recording disks having the island pattern according to this invention.

DETAILED DESCRIPTION OF THE INVENTION

Figure 1:
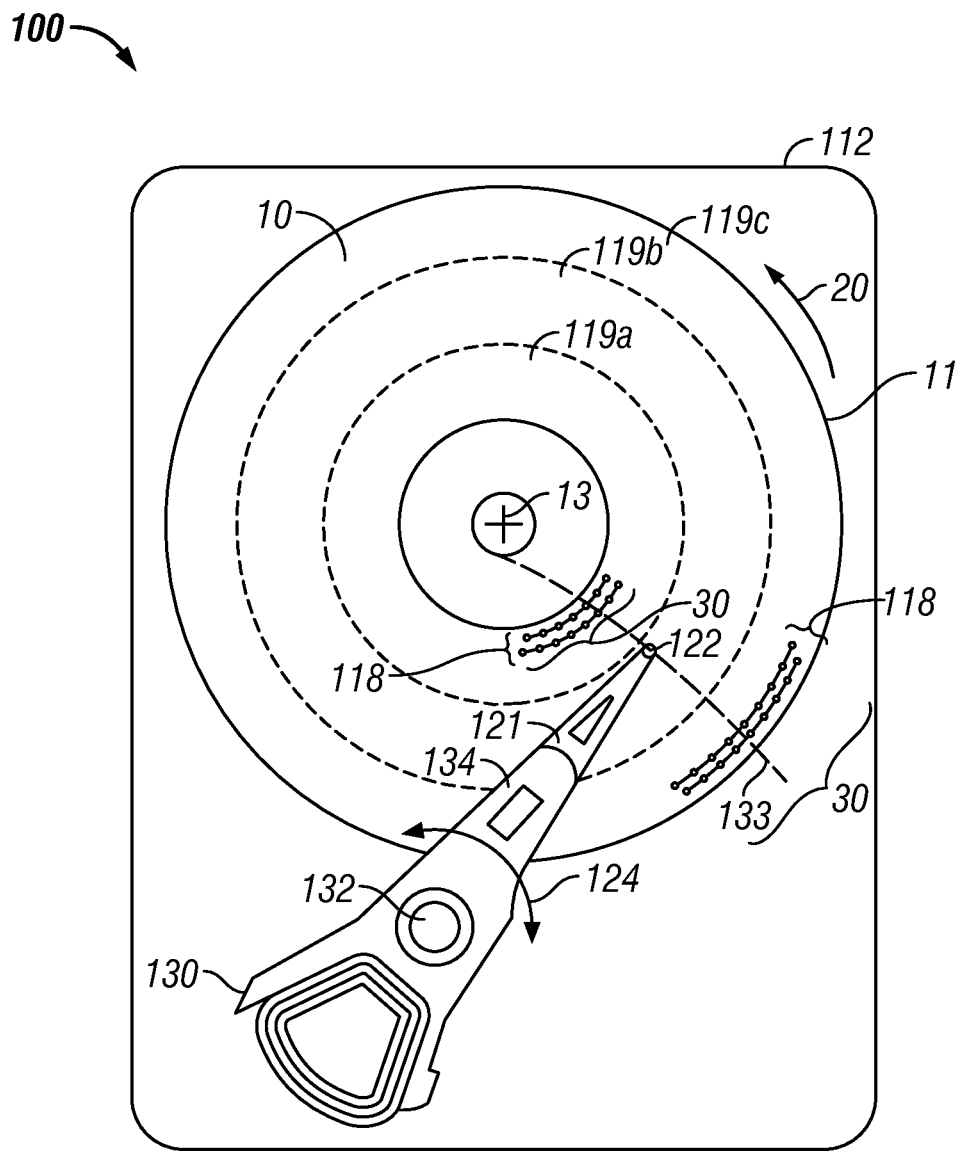
FIG. 1 is a top view of a disk drive with a patterned-media type of magnetic recording disk as described in the prior art.

FIG. 1 is a top view of a disk drive 100 with a patterned magnetic recording disk 10 as described in the prior art. The drive 100 has a housing or base 112 that supports an actuator 130 and a drive motor for rotating the magnetic recording disk 10 about its center 13. The actuator 130 may be a voice coil motor (VCM) rotary actuator that has a rigid arm 134 and rotates about pivot 132 as shown by arrow 124. A head-suspension assembly includes a suspension 121 that has one end attached to the end of actuator arm 134 and a head carrier 122, such as an air-bearing slider, attached to the other end of suspension 121. The suspension 121 permits the head carrier 122 to be maintained very close to the surface of disk 10. A magnetoresistive read head (not shown) and an inductive write head (not shown) are typically formed as an integrated read/write head patterned on the trailing surface of the head carrier 122, as is well known in the art. As the actuator 130 rotates about pivot 130, the head carrier 122 and attached read/write head make an arcuate path 133 across the surface of disk 10.

The patterned magnetic recording disk 10 includes a disk substrate 11 and discrete data islands 30 of magnetizable material on the substrate 11. The data islands 30 function as discrete magnetic bits for the storage of data and are arranged in radially-spaced circular tracks 118, with the tracks 118 being grouped into annular bands 119a, 119b, 119c. The grouping of the data tracks into annular bands permits banded recording, wherein the angular spacing of the data islands, and thus the data rate, is different in each band. In FIG. 1, only a few islands 30 and representative tracks 118 are shown in the inner band 119a and the outer band 119c. As the disk 10 rotates about its center 13 in the direction of arrow 20, the movement of actuator 130 allows the read/write head on the trailing end of head carrier 122 to access different data tracks 118 on disk 10.

Figure 2A:
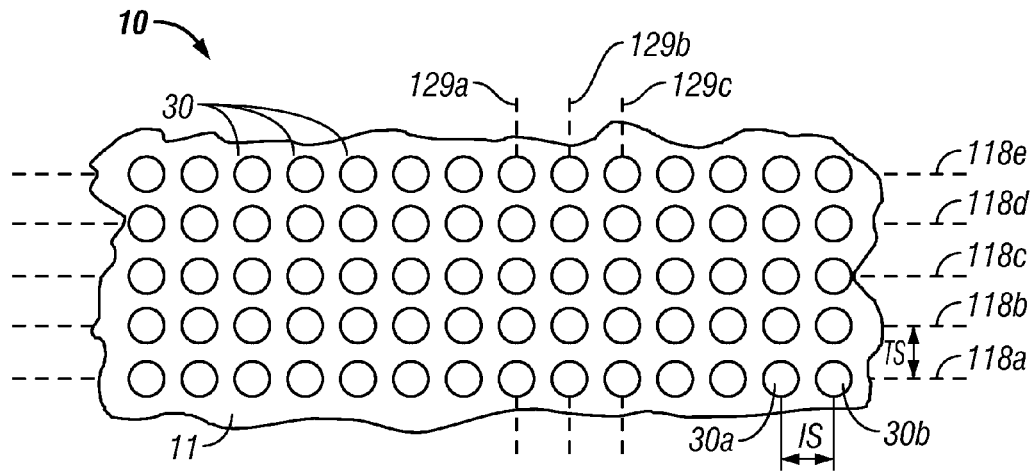
FIG. 2A is a top view of an enlarged portion of a patterned-media type of magnetic recording disk showing the detailed arrangement of the data islands in one of the bands on the surface of the disk substrate.

FIG. 2A is a top view of an enlarged portion of disk 10 showing the detailed arrangement of the data islands 30 in one of the bands on the surface of disk substrate 11 according to the prior art. The islands 30 are shown as being circularly shaped, but may have other shapes such as generally rectangular or generally elliptical. The islands 30 contain magnetizable recording material and are arranged in tracks spaced-apart in the radial or cross-track direction, as shown by tracks 118a-118e. The tracks are typically equally spaced apart by a fixed track pitch or spacing TS. Within each track 118a-118e, the islands 30 are equally spaced apart by a fixed along-the-track island pitch or spacing IS, as shown by typical islands 30a and 30b, where IS is the spacing between the centers of two adjacent islands in a track. In FIG. 2A, the IS and TS are depicted as being equal so the BAR is 1. The islands 30 are also arranged into radial lines, as shown by radial lines 129a, 129b and 129c that extend from disk center 13 (FIG. 1). Because FIG. 2A shows only a very small portion of the disk substrate 11 with only a few of the data islands, the pattern of islands 30 appears to be two sets of perpendicular lines. However, tracks 118a-118e are concentric rings centered about the center 13 of disk 10 and the lines 129a, 129b, 129c are not parallel lines, but radial lines extending from the center 13 of disk 10. Thus the angular spacing between adjacent islands as measured from the center 13 of the disk for adjacent islands in lines 129a and 129b in a radially inner track (like track 118e) is the same as the angular spacing for adjacent islands in lines 129a and 129b in a radially outer track (like track 118a).

The radial lines (like lines 129a, 129b, 129c) may be perfectly straight radial lines but are preferably arcs or arcuate-shaped radial lines that replicate the arcuate path 133 of the read/write head on the rotary actuator 130. Such arcuate-shaped radial lines provide a constant phase position of the data islands as the head sweeps across the data tracks. There is a very small radial offset between the read head and the write head, so that the synchronization field used for writing on a track is actually read from a different track. If the islands between the two tracks are in phase, which is the case if the radial lines are arcuate-shaped, then writing is greatly simplified.

Figure 2B:
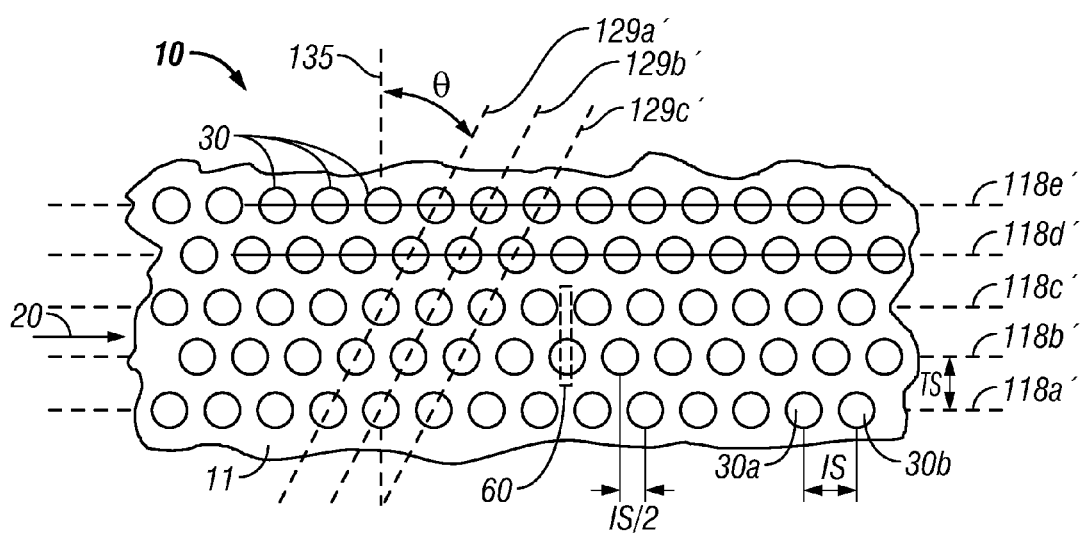
FIG. 2B is a top view of an enlarged portion of a patterned-media type of magnetic recording disk showing a pattern for the data islands different from the pattern of FIG. 2A.

FIG. 2B shows an enlarged portion of disk 10 with a pattern of data islands 30 for multi-track recording. Within each track 118a'-118e', the islands 30 are equally spaced apart by a fixed along-the-track island spacing IS, as shown by typical islands 30a, 30b, where IS is the spacing between the centers of two adjacent islands in a track. However, the islands in each track are shifted in the along-the-track direction by one-half the island spacing (IS/2) from the islands in adjacent tracks. For example, the islands in track 118b' are shifted a distance IS/2 from the islands in adjacent tracks 118a' and 118c'. As a result, the islands 30 are also arranged in radial lines that are not purely radial, but generally radially-directed, as shown by lines 129a', 129b', 129c. The lines 129a', 129b', 129c' form an acute angle θ with a purely radial line 135. The lines 129a', 129b', 129c' are not parallel lines, but lines with a constant angular spacing, i.e., the angular spacing as measured from the center 13 of the disk for adjacent bits in lines 129a' and 129b' in a radially inner track (like track 118e') is the same as the angular spacing for adjacent bits in lines 129a' and 129b' in a radially outer track (like track 118a').

FIG. 2B also shows a multi-track head element 60, which may represent either a read head or a write head, aligned over the tracks 118b' and 118c'. The head element 60 has a lateral or cross-track width which enables writing and reading without excessive interference from tracks adjacent to the tracks being written or read. The cross-track width head element 60 is thus less than 2TP, typically about 0.75*(2TP) for the write head and about 0.60*(2TP) for the read head. The head element 60 reads or writes all the data islands in both tracks 118b' and 118c' by alternately reading or writing the islands from each of the two tracks in succession. If the element 60 is a read head, then as the disk rotates in the direction of arrow 20, the magnetized data islands in tracks 118b' and 118c' will pass the head element 60 and generate a specific readback signal, depending on the directions of magnetization of the individual islands. However, because the islands in adjacent tracks 118a' and 118c' are shifted in the along-the-track direction by a distance IS/2 from the islands in track 118b', the readback signals from tracks 118b' and 118c' will be out of phase with one another.

It may also be desirable to have the islands in the pattern of FIG. 2B be arranged in arcuate-shaped lines for the same reason as explained above for the pattern of FIG. 2A. However, in this case the islands in alternate tracks form arcuate-shaped lines in the radial direction. Thus line 135, which intersects islands in alternate rows 118a', 118c' and 118e', would have the desired arcuate shape that replicates the path 133 of the read/write head as the rotary actuator moves the head across the tracks. The lines 129a', 129b' and 129c' would thus not be perfectly straight but would have a shape that results in the islands in alternate tracks forming the desired arcuate-shaped line.

Figure 3:
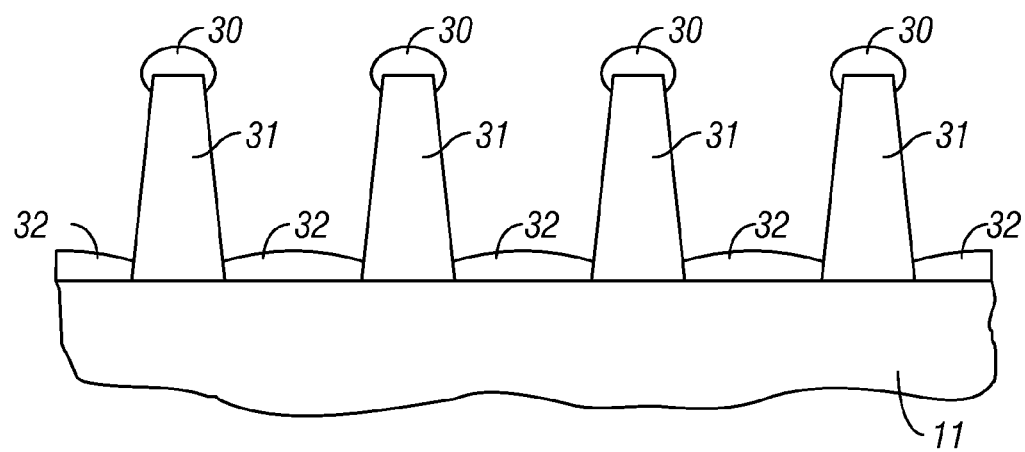
FIG. 3 is a side sectional view of one type of a patterned-media disk showing the data islands as elevated, spaced-apart pillars that extend above the disk substrate surface with trenches between the pillars.

Patterned media like that depicted in FIG. 2B may be fabricated by nanoimprinting from a master disk or template. In one type of patterned media fabricated by nanoimprinting from a master template, the magnetic layers and other layers needed for the magnetic recording disk are first deposited on the flat disk substrate. The polymer film used with nanoimprinting is then pressed on top of these layers. The polymer film receives the reverse image of the template pattern and then becomes a mask for subsequent milling, etching or ion-bombarding the underlying layers. In another type of patterned media made by nanoimprinting, the data islands are elevated, spaced-apart pillars that extend above the disk substrate surface to define troughs or trenches on the substrate surface between the pillars. This type of patterned media is shown in the sectional view in FIG. 3. In this type of patterned media the substrate 11 is fabricated by nanoimprinting and etching to from a pattern of pillars 31 and trenches or regions between the pillars. The magnetic recording layer material is preferably perpendicular recording material and is then deposited over the entire surface of the pre-etched substrate to cover both the ends of the pillars 31 and the trenches between the pillars 31, resulting in the data islands 30 of magnetic recording layer material and trenches 32 of magnetic recording layer material. The trenches 32 of recording layer material may be spaced far enough from the read/write head to not adversely affect reading or writing to the recording layer material in islands 30, or the trenches may be rendered non-magnetic by "poisoning" with a material like Si.

The islands in the multi-track recording example of FIG. 2B are circular islands arranged in a hexagonal-close-packed (hcp) pattern wherein the centers of three closest islands in two tracks form an equilateral triangle. This results in the islands being arranged in lines 129a', 129b' and 129c' that are canted by an angle θ=30° from a radial line 135 and with a BAR of 0.87. This 30° angle will be fixed for all bands to assure the hcp island pattern across the disk. Circular islands with an hcp pattern and a low BAR of 0.87 are preferred because of ease of lithography and fabrication. However, a low BAR results in a very narrow track pitch or spacing (TS) which makes fabrication of the read and write heads difficult. A low BAR also stresses the track following servo system because of very narrow tracks, and lowers the data rate due to relatively low linear (along-the-track) bit density.

Figure 4:
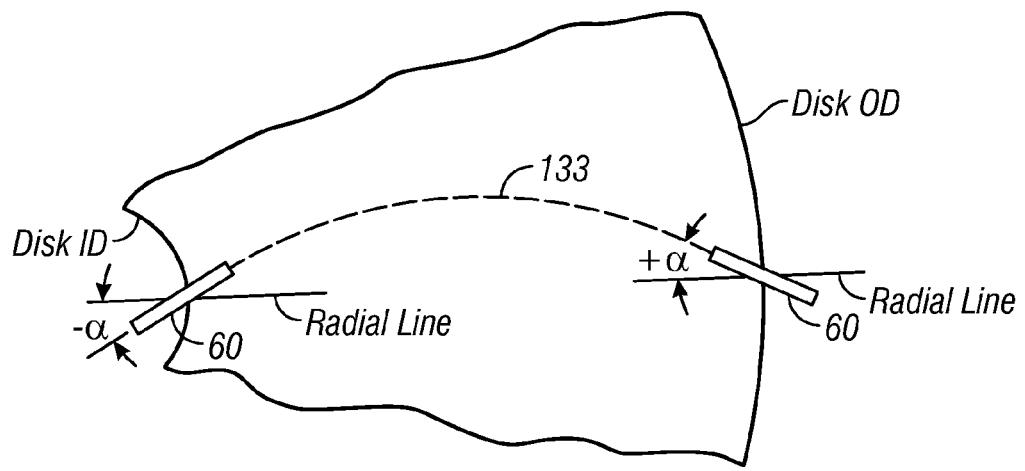
FIG. 4 is an exaggerated view for showing the head skew near the disk inside diameter (ID) and disk outside diameter (OD).

An additional problem with multi-track recording, especially with circular islands in an hcp pattern, arises because of head "skew". Because the read head or element is fixed at the tip of the rotary actuator, it makes an angle with the tracks as it moves along the arcuate path 133 (see FIG. 1). This angle varies as a function of track radius. FIG. 4 is an exaggerated view for showing the angle the head element 60 makes with a disk radius (defined herein as the skew angle α) near the disk OD and the disk ID. The skew angle thus varies from +α to −α from disk OD to disk ID, with α=0 near the disk mid-diameter (MD). The skew angle α is a well-known mathematical function of disk radius that is calculated from the known disk drive geometry, as described for example in U.S. Pat. No. 7,466,506 B1. Typical maximum values of head skew for conventional disk drives are between about 10° and 20°. Thus, it can be appreciated from FIG. 2B that at high absolute values of α, the head element 60 will be skewed from the orthogonal-to-the-track position depicted in FIG. 2B. This can result in the head element 60 reading islands from adjacent tracks simultaneously, rather than alternately as required for multi-track recording.

Figure 5A:
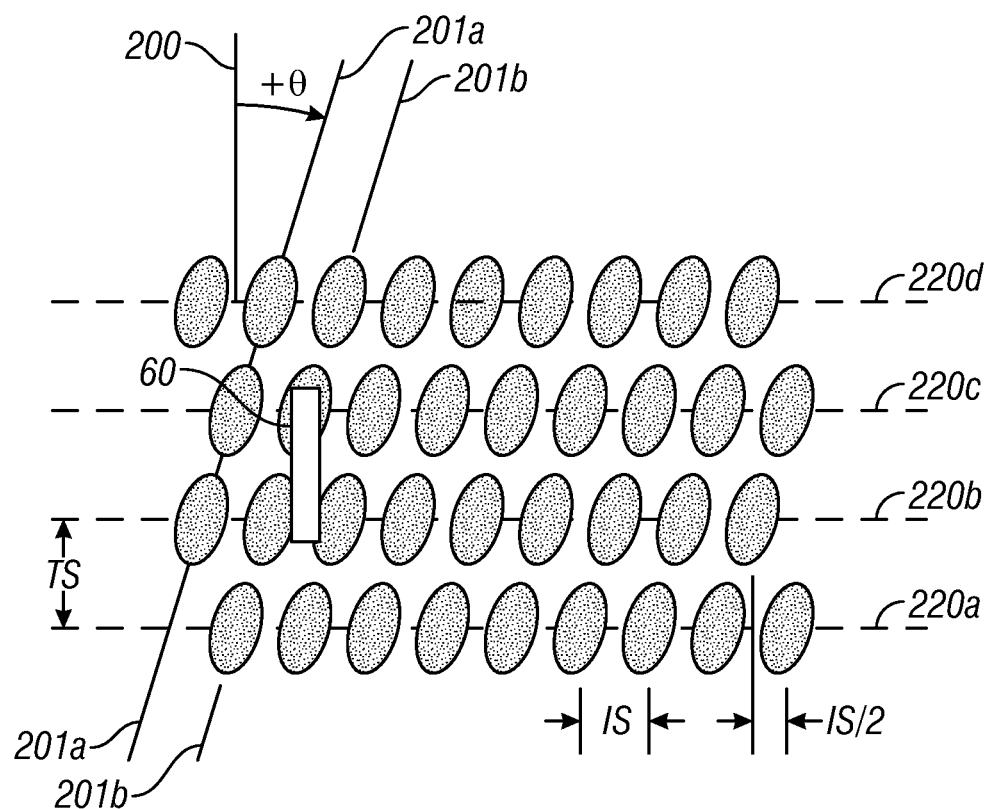
FIG. 5A shows a portion of the patterned-media disk for multi-track recording according to the invention with a bit aspect ratio (BAR) of 2 without compensation for head skew.

In this invention the patterned-media disks for multi-track recording are fabricated by nanoimprinting from a master template. The disks are preferably perpendicular magnetic recording disks so the islands are magnetizable perpendicularly to the substrate. The islands are arranged to have a BAR greater than 0.87 (the BAR for an hcp island pattern) and are arranged along lines canted relative to a disk radius by an angle that is not fixed, but varies to compensate for head skew. FIG. 5A shows a portion of the patterned-media disk for multi-track recording according to the invention with a BAR of 2 (TS/IS=2) without compensation for head skew. The generally elliptical shaped data islands in tracks 220a, 220b, 220c, 220d are arranged along lines, like lines 201a, 201b, that make an angle θ=tan$^{-1}$(IS/(2*TS)) with a radial line 200. The islands in each track are shifted by one-half IS from the islands in adjacent tracks. Because the BAR=2, the ratio TS/IS=2 and thus the angle θ=14°. The islands can be patterned with the desired value for a "high" BAR (i.e., preferably greater than 1) to optimize the TS for the particular head design.

Figure 5B:
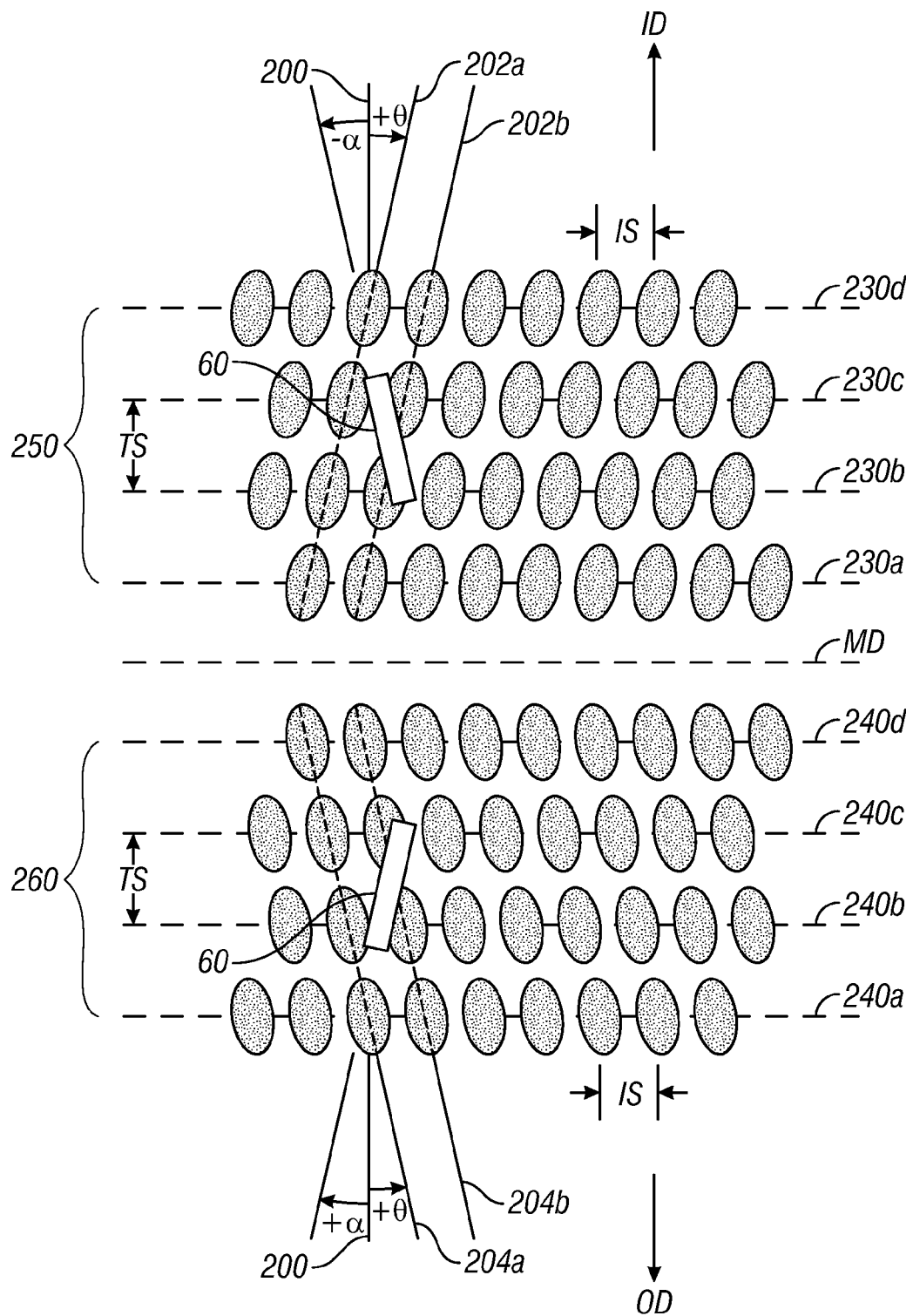
FIG. 5B shows a portion of a radially inner band and a radially outer band of the patterned-media disk for multi-track recording according to the invention with a BAR of 2 and with compensation for head skew.

FIG. 5B shows a portion of the patterned-media disk for multi-track recording according to the invention with a BAR of 2 and also with compensation for head skew. In this example, there are portions of two bands shown; a band 250 near the disk ID and a band 260 near the disk OD. The islands in tracks 230a, 230b, 230c, 230d in band 250 are arranged along lines, like lines 202a, 202b, that are canted with a radial line 200 to make an angle +θ=tan$^{-1}$(IS/(2*TS))−ABS(α), where +θ is denoted as clockwise. Thus the angle the lines 202a, 202b are canted has been reduced from the angle shown in FIG. 5A by the amount of head skew α, which is approximately 10° in this example. As shown in FIG. 5B, this shifts the islands in a track by a slight additional amount so that the islands are not shifted precisely by IS/2 as in FIG. 5A. However, this improves the relative positions of islands in one track, such as track 230b, and its neighboring track, such as track 230c, so that the two tracks are out of phase with respect to the read element 60. Thus the read element 60 passes over and senses the magnetic flux from islands in the two tracks in a sequential alternating manner. This can be appreciated by noting that if the read element 60 in FIG. 5A were to have the skew shown in FIG. 5B, it would be positioned over islands in both tracks 220b and 220c, instead of only over an island on one track.

The islands in tracks 240a, 240b, 240c, 240d in band 260 near the disk OD are arranged along lines, like lines 204a, 204b, that are canted with a radial line 200 to make an angle −θ=tan$^{-1}$(IS/(2*TS))−ABS(α), where −θ is denoted as counterclockwise. The bands 250, 260 near the disk ID and OD, respectively, are the regions of the disk where the ABS(α) is the greatest. At some point near the disk mid-diameter (MD), typically within the middle third of the disk, the skew is smallest, essentially zero. Thus in this invention at some disk diameter near the MD, the angle θ will switch from positive to negative so that the canted lines in bands on one side of this MD, like lines 204a, 204b in bands 260, will be canted in a direction opposite to the direction the lines on the other side of this MD, like lines 202a, 202b in band 250, are canted. Thus there will be a plurality of bands between the disk ID and MD where the angle θ will be in one direction from a radial line (e.g., clockwise) and a plurality of bands between the disk MD and OD where the angle θ will be in the opposite direction from a radial line (e.g., counterclockwise). For the example where the BAR=2 and the head skew α varies from −10° at the disk ID to +10° at the disk OD, the angle θ will increase from +4° at the ID to +14° near the MD, then decrease from −14° near the MD to −4° at the OD.

Thus, as shown in FIG. 5B, to compensate for head skew α, the absolute value of the angle θ is reduced by the absolute value of α. The angle θ is positive in bands near the ID and negative in bands near the OD and preferably varies from band to band. While it is conceptually possible to also make a workable island pattern by increasing the absolute value of the angle θ by the absolute skew α, this would result in a generally larger angle θ and thus make fabrication of the master template more difficult. To simplify the process for making the master template, the preferred island pattern is to have a single fixed value of θ for a single band, with different values of θ for different bands as a result of the head skew α being a function of disk radius. The value of head skew α selected to arrive at the desired angle θ can be the average skew value for the band. The value of θ can also be selected to be the same for two or more adjacent bands. The value of θ can also be selected to vary within a band, although this would result in a more complicated fabrication process for the master template.

The patterned-media disks with the island pattern described above are fabricated by nanoimprinting from a master template. The master template may be used to directly nanoimprint the disks, but more likely is used to make replica templates which are then used to directly nanoimprint the disks. The master template is made using a variation of known template fabrication processes.

A high-level representation of the prior art method for fabricating a master template is illustrated in FIGS. 6A-6C, which show a small portion of one annular band of the master template with the radial or cross-track direction being vertical and the circumferential or along-the-track direction being horizontal. In FIG. 6A, the first step is to create radial stripes 308 on a substrate 300 at a density achievable by conventional e-beam or other lithography. The substrate 300 is any suitable material, such as, but not limited to, single-crystal Si, polycrystalline Si, silica, quartz, glass and nickel. Next, in FIG. 6B, the density of the radial stripes is doubled. In one approach the doubling of the radial stripes 308 can be accomplished by guided self-assembly of block copolymer material into its components, resulting in generally radial lines 312 representing one of the block copolymer components. This approach is described in published application US 20090308837 A1 which is assigned to the same assignee as this application. In another approach the doubling of the radial stripes 308 can be accomplished by sidewall lithography. The sidewall lithography process results in the deposition of material on both sidewalls of the stripes 308, which are elevated ridges, so that after removal of the ridges, generally parallel lines 312 remain in place of the ridges. This approach is described in U.S. Pat. No. 7,758,981 B2 which is assigned to the same assignee as this application.

The radial lines 312 are then used as an etch mask to etch radial lines in the substrate 300 and a second conventional e-beam or other lithography step is performed to cut the radial lines of substrate material into circumferential concentric segments 313, resulting in features 328, as shown in FIG. 6C. The features 328 correspond to the data islands and the segments 313 correspond to the data tracks on the disks that will be nanoimprinted. Thus the segments 313 have a cross-segment spacing equal to TS and the features in each segment have a circumferential spacing IS. The circumferential feature spacing IS in each segment 313 is difficult to achieve with the resolution of e-beam lithography. The features 328 may be raised pillars 328 that will serve as an etch mask for etching the substrate 300, so that after the pillars 328 are removed, the substrate 300 will have raised pillars of substrate material corresponding to the individual data islands on the disks that will be nanoimprinted. The template may also be fabricated such that after etching the resulting substrate 300 will have a pattern of recesses corresponding to features 328 instead of pillars.

The method for making the master template used to nanoimprint the patterned-media disks with the island pattern according to this invention is shown in a high-level representation in FIGS. 7A-7C. It is like the prior art method described in FIGS. 6A-6C except for the step shown in FIG. 6A for making the radial stripes 308. In FIG. 7A, the stripes 408 are formed on substrate 400 at a density achievable by conventional e-beam or other lithography and are not radial, but are canted at the angle θ relative to a radial line 402. The angle θ is preferably the same for a band, but varies from band to band, as described above, to compensate for the variation in head skew α. The circumferential spacing of the canted stripes 408 is approximately 2*IS, where IS is the desired island spacing for the subsequently nanoimprinted disks. Then in FIG. 7B, the density of the canted stripes 408 is doubled, using one of the approaches described above, to create canted lines 412 with a circumferential spacing of IS. The critical dimension for the block copolymer is the period of the stripes 408 in a direction perpendicular to the stripes, i.e., the actual distance between the canted stripes 408. Thus, IS is equal to SS/cos(θ), where SS is the stripe spacing or pitch in the direction normal to the stripes that are canted at the angle θ. The practical impact of this is that IS gets larger with increasing θ, so IS is slightly different in different bands. However, this variation is relatively small. For example, in the example above where θ varied from 4° to 14°, this would result in a variation in IS of only about 3%.

Next, in FIG. 7C, the canted lines 412 are used as an etch mask to etch canted lines in the substrate 400 and a second conventional e-beam or other lithography step is performed to cut the canted lines of substrate material into circumferential segments 413, resulting in features 428. The second e-beam or other lithography step determines the track spacing for the data tracks in the subsequently nanoimprinted disks. The features 428 have a generally parallelogram shape as a result of the canted lines 412, but the subsequent nanoimprinting and etching steps on the disks results in generally rounded corners, so that the data islands have a generally elliptical shape, as shown in FIG. 5B. FIG. 7C thus has a pattern of features 428, that may be pillars or recesses in substrate 400, that will replicate as the desired island pattern into the nanoimprinted disks. Thus the segments 413 have a cross-segment spacing equal to TS and the features in one segment are shifted radially relative to the features in the radially adjacent segments by approximately IS/2. The patterned substrate 400 of FIG. 7C can serve as a master template to directly nanoimprint the disks, or to make replica templates which are then used to directly nanoimprint the disks. This invention is also a template, which can be a master template or a replica template, that has a pattern of features that will be replicated into patterned-media disks resulting in the above-described pattern of islands.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A patterned magnetic recording disk comprising:
   a substrate;
   a plurality of discrete magnetizable islands on the substrate, the islands being arranged into a plurality of circular concentric tracks, the tracks being arranged into a plurality of annular bands;
   wherein the islands in each of the plurality of bands have an along-the-track island spacing IS and the tracks have a cross-track spacing TS greater than 0.87*IS, with the islands in a track being shifted along-the-track from the islands in radially adjacent tracks; and
   wherein the islands in each of the plurality of bands are arranged in canted lines across the tracks of the band, the canted lines being at an acute angle θ with a radial line, wherein θ is a different value in each of the plurality of bands.

2. The disk of claim 1 wherein the value of θ in the band near the disk inside diameter (ID) is less than the value of θ in the band near the disk middle diameter (MD).

3. The disk of claim 1 wherein the value of θ is a function of $\tan^{-1}(IS/(2*TS))$.

4. The disk of claim 1 wherein the value of θ is a function of the radial location of the band.

5. The disk of claim 1 wherein the value of θ is different for different tracks in a band and is a function of the radius of the track in the band.

6. The disk of claim 1 wherein the islands in a track are shifted along-the-track from the islands in radially adjacent tracks by approximately IS/2.

7. The disk of claim 1 wherein the acute angle θ is in one direction from a radial line for a plurality of bands between the disk inside diameter (ID) and disk mid-diameter (MD) and in the opposite direction from a radial line for a plurality of bands between the MD and the disk outside diameter (OD).

8. The disk of claim 1 wherein the islands are magnetizable in a direction generally perpendicular to the substrate.

9. The disk of claim 1 wherein the islands have a generally elliptical shape.

10. The disk of claim 1 wherein the islands are pillars extending generally perpendicularly from the substrate with magnetizable material on the tops of the pillars.

11. A magnetic recording disk drive comprising:
    the disk according to claim 1;
    a read head having a cross-track width greater than TS for reading all the islands in at least two radially adjacent tracks without movement in the cross-track direction; and
    a rotary actuator connected to the read head for moving the read head to different tracks, whereby the read head makes a skew angle relative to a disk radius, the skew angle being a function of radial location of the track on which the read head is positioned.

12. The disk drive of claim 11 wherein the value of θ is a function of the skew angle.

13. The disk drive of claim 11 wherein the skew angle at approximately the middle radius of a band is α and the value of θ for a band is approximately $\tan^{-1}(IS/(2*TS))-ABS(\alpha)$.

14. A template for nanoimprinting magnetic recording disks comprising:
    a substrate having a center;
    a plurality of discrete features on the substrate, the features being arranged into a plurality of circular concentric segments about said center, the segments being arranged into a plurality of annular bands;
    wherein the features in each of the plurality of bands have an along-the-segment feature spacing and the segments have a cross-segment spacing greater than 0.87 times the along-the-segment feature spacing, with the features in a segment being shifted along-the-segment from the features in radially adjacent segments; and
    wherein the features in each of the plurality of bands are arranged in canted lines across the segments of the band, the canted lines being at an acute angle θ with a radial line, wherein θ is a different value in each of the plurality of bands.

15. The template of claim 14 wherein the acute angle θ is in one direction from a radial line for a plurality of bands between the template inside diameter (ID) and template mid-diameter (MD) and in the opposite direction from a radial line for a plurality of bands between the MD and the template outside diameter (OD).

16. The template of claim 14 wherein the features are pillars raised above a surface of the substrate.

17. The template of claim 14 wherein the features are recesses below the upper surface of the substrate.

* * * * *